United States Patent Office 3,468,869
Patented Sept. 23, 1969

3,468,869
ANTISTATIC MATERIALS
Edwin Collier Sherburne, Wilmington, Del., assignor to Atlas Chemical Industries, Inc., Wilmington, Del., a corporation of Delaware
No Drawing. Filed Apr. 8, 1966, Ser. No. 541,108
Int. Cl. C08f 45/44, 29/04
U.S. Cl. 260—94.9        6 Claims

ABSTRACT OF THE DISCLOSURE

Substituted amine oxides used as internal antistatic agents for polymers.

---

This invention relates to polymeric materials. More particularly, this invention relates to polymeric materials containing an internal antistatic agent which inhibits the tendency of such materials to collect a static electric charge on the surface thereof and to methods for producing said polymeric materials.

It is well known that plastic and polymeric materials, such as polyethylene, polypropylene, vinyl plastic, acrylic resins, polyester resins, polyamide resins, cellulose acetate, Teflon and the like, have, in most cases, a marked tendency to accumulate electrostatic charges on the surfaces thereof. Static electricity developed on molded plastics, fibers and films, however, causes great difficulties in the production, processing and end use of these materials. For example, if the problems presented by the accumulation of electrostatic charges on the surfaces of most synthetic fibers were not overcome, the production of most synthetic fibers of a hydrophilic nature would either be impossible or would result in a product of inferior quality because of filament stretching or breakage caused by clinging and ballooning of the fibers. Likewise, subsequent processing of the fibers to produce yarns and fabrics necessitates the control of accumulated electrostatic charges on the fibers and the yarns and fabrics produced therefrom as well. Moreover, the final fabric product itself develops an electrostatic charge which is likely to be troublesome to the user. Plastic filaments are subject to similar problems relating to the accumulation of electrostatic charges. Molded or shaped plastic articles, because of their tendency to accumulate electrostatic charges attract dirt, dust and lint, which cling to their surfaces and are difficult to remove. Many of the difficulties which result from the accumulation of electrostatic charges on plastic and polymeric materials have in the past been substantially reduced or eliminated, at least temporarily, by the use of chemical antistatic agents in the form of liquids or soft solids which may be applied to the surface of the plastic or polymeric material to prevent or minimize the accumulation of electrostatic charge. Because of the physical form of such agents and the fact that they are generally soluble in water the antistatic effect is impermanent since the agents can easily be washed or rubbed off the material treated therewith. Furthermore, because of the soft, liquid or oily nature of most such antistatic agents, a film thereof on the surface of the plastic material will often cause dirt and dust to adhere to the surface of the material, even in the absence of an electrostatic charge. Manifestly, treatment of plastic and polymeric material to prevent or reduce the tendency thereof to accumulate an electrostatic charge which overcomes the disadvantages of impermanence and the deposition of a dust-and-dirt-collecting film on the surface thereof will provide optimum conditions for the processing and use of such material.

It is, accordingly, an object of this invention to provide plastic and polymeric materials having a substantially reduced tendency to accumulate an electrostatic charge on the surface thereof.

It is another object of this invention to provide a method of producing plastic and polymeric materials having a reduced tendency to accumulate an electrostatic charge on the surface thereof.

The foregoing objects and still further objects are broadly achieved in accordance with the method of this invention by incorporating into the plastic or polymeric material itself a class of internal antistatic agents which comprise alkyl amine oxides characterized by the following generalized formula:

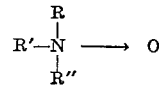

wherein R is an alkyl radical containing from 12 to 22 carbon atoms and wherein R' and R" are each independently selected from the group consisting of an alkyl radical containing from 1 to 5 carbon atoms, a hydroxyalkyl radical containing from 1 to 5 carbon atoms and polyoxyalkylene ethers of said hydroxyalkyl radicals containing from 2 to 3 carbon atoms per oxyalkylene group and from 1 to 20 oxyalkylene groups per hydroxy alkyl radical or R' and R" taken together form with the nitrogen atom a 5 or 6 membered heterocyclic cycloaliphatic ring containing in addition to said nitrogen atom not more than 1 additional heteroatom selected from the group consisting of oxygen and sulfur.

The fatty amines from which the alkyl amine oxides used in accordance with the present invention are derived may be prepared in a variety of ways starting from naturally occurring materials such as coconut oil and tall oil or from petrochemicals such as the "Alfol" alcohols.

Fatty amines, for example, may be prepared by the hydrolysis of a fat such as coconut oil, subsequent reaction of the free fatty acid resulting therefrom with ammonia and then hydrogenation of the resulting nitriles in the manner described by R. L. Kenyon, D. V. Stingley and H. P. Young, Ind. Eng. Chem. 42, 202–13 (1950). The primary amines so obtained can then be alkylated to tertiary amines in the conventional manner.

Alternatively, fatty tertiary amines may be prepared by hydrogenolysis of a suitable fat, such as coconut oil, in the presence of a catalyst at 200–300° C. and 100–300 atm. pressure followed by reaction of the fatty alcohols resulting therefrom with dimethylamine in the manner described by R. E. Kirk and D. F. Othmer, Encyclopedia of Chemical Technicology, vol. 5, Interscience, New York, 1950, page 835.

Straight-chain primary alcohols derived from petrochemical raw materials may be converted to tertiary amines in high yields by direct reaction with a secondary amine in the presence of aluminum oxide at 400° C. and 2,000 p.s.i. pressure in the manner described by M. T. Atwood, JAOCS 40, 64–6 (1963). Hydroxyalkyl fatty tertiary amine precursors of hydroxyalkyl fatty tertiary amine oxides may be prepared in a variety of ways including the condensation in suitable molar proportions of alkylene oxide with a primary or secondary fatty amine. Polyoxyalkylene ethers of primary and secondary fatty amines may be similarly prepared. In general, the condensation products of alkylene oxides and primary and secondary fatty amines to form tertiary amines suitable for use in preparing fatty amine oxides useful in the practice of this invention may be prepared in the manner described in U.S. Patents 2,337,004, 2,593,466 and 2,629,733, all of which are hereby incorporated by reference.

Amine oxides are reaction products of tertiary amines and hydrogen peroxide or peroxy acids. Aliphatic tertiary amines may be readily oxidized by hydrogen peroxide to produce fatty amine oxides suitable for use in accordance with the present invention, whereas heterocyclic amines require the use of peroxy acids to produce amine oxides suitable for such use.

Fatty amine oxides useful in the process of the present invention may be prepared by stirring a suitable fatty tertiary amine with a large excess (150%) of 35% hydrogen peroxide at room temperature for several hours. Methanol may be added if the amine is sparingly soluble. The catalyst is added to decompose the hydrogen peroxide and the solution is sttirred for a period of time usually several hours, until tests for hydrogen peroxide made with lead sulfide paper and for amine made with phenolphthalein spot tests are negative.

Alternatively, fatty amine oxides suitable for use in accordance with the method of the present invention may be made in the manner described by D. B. Lake and G. L. K. Hoh, Journal of the American Oil Chemists Society, vol. 40, pp. 628–31. In the alternative procedure, the tertiary amine is preheated to 60° C., and 35% aqueous hydrogen peroxide is added over a one hour period with good agitation. The reaction mixture is kept at 60–65° C. during peroxide addition; at temperatures much above this, the solution becomes yellow, and at lower temperatures, a longer reaction time is required. During the one hour period while peroxide is being added, the mixture will gel unless water is also added. The water required for dilution is added in portions just sufficient to keep the reaction mixture fluid. After all the peroxide has been charged, the remaining dilution water to give the desired final concentration is added and the temperature of the reaction mixture is raised to 75° C. Conversions approaching 100% can be realized in an additional 3 to 4 hours at the higher temperature. The solution is cooled and unreacted hydrogen peroxide is destroyed by adding a stoichiometric amount of sodium sulfite.

Amine oxides suitable for use in accordance with this invention may be prepared according to methods disclosed in U.S. Patents 3,047,579 and 3,085,094, hereby incorporated by reference.

The following is a specific example of the preparation of a tertiary amine oxide suitable for use in accordance with the present invention:

EXAMPLE 1

Preparation of polyoxyethylene (20) lauryl amine oxide 532 grams of polyoxyethylene (20) lauryl amine were dissolved in 500 ml. of isopropyl alcohol in a two-liter round-bottomed flask. The flask was equipped with stirrer and thermometer. Through an addition funnel were added 121 grams of 35% $H_2O_2$ solution dropwise over a period of 25 minutes. The reaction mixture was stirred at 25° C. to 50° C. for a period of 24 hours. 10 grams additional $H_2O_2$ were added after the 18th hour and 10 grams additional $H_2O_2$ were also added after the 22nd hour. 2 mg. of 5% platinum on carbon were then added to the reaction. The reaction mixture was heated to 50° C. to decompose any excess peroxide. Filter aid was subsequently added to the reaction mixture and the mixture filtered to remove the platinum and carbon. Isopropyl alcohol was then stripped off under vacuum. The residue constituted a yield of 539 grams of a pale yellow water-soluble liquid.

In accordance with the method of the present invention, amine oxides of the kind hereinbefore defined are introduced into a wide variety of plastic materials either at some stage in the process of producing the plastic material, as during the polymerization thereof or, alternatively, in the case of thermoplastic materials, the plastic or polymeric material may be converted by heat to liquid form and the amine oxide introduced thereinto to form a solution or uniform suspension therein, after which the plastic or polymeric material is allowed to cool once again to the solid state. In general, it has been found that fatty amine oxide incorporated into plastic or polymeric materials in amounts within the range of about 0.1% to about 20.0% by weight of the total composition successfully impart improved anti-static characteristics to said plastic or polymeric materials.

Among the plastic and polymeric materials to which superior antistatic characteristics may be imparted by incorporation thereinto of fatty amine oxides of the kind hereinbefore described are polyalkylene resins, such as polyethylene and polypropylene; vinyl resins, such as polyvinyl chloride, polyvinyl acetate, polyvinyl alcohol and polystyrene; acrylic resins, such as polymethyl methacrylate; and polymers of acrylic and methacrylic acids; synthetic polyamide resins, such as nylon; natural polyamide resins, such as casein; cellulosic derivatives, such as rayon, including cellulose acetate; polyvinyl acetals, such as polyvinyl butyral, polyester resins, such as glyceryl phthalate polymer; phenolic resins, such as phenolformaldehyde resin; urea resins, such as urea-formaldehyde resin; polyurethane resins; halogenated polyalkylene resins, such as chloroprene; melamine resins and many other plastic and polymeric materials which can be produced in the form of fibers, films or molded or shaped articles.

The following is a specific example of the preparation of a plastic material having improved antistatic properties in accordance with the method of this invention:

EXAMPLE 2

45 grams of polyethylene and 5 grams of dimethyl hydrogenated tallow amine oxide were melted and blended together thoroughly. The amine oxide dissolved in the melted polyethylene forming a crystal clear solution. The solution was poured on a clear glass plate and allowed to solidify as a thin film. A film of polyethylene, without any additive was prepared for use as a control. Strips one inch in width and approximately three inches in length were cut from the control film of polyethylene and the film of polyethylene containing the amine oxide additive. The electrical resistance of each strip was measured on an ohmmeter by clamping the one-inch strips between electrodes two inches apart. The resistance of the control polyethylene film (without additive) was so high (above $10^{15}$ ohms) that it could not be measured by the instrument. The resistance of the polyethylene film containing dimethyl hydrogenated tallow amine was easily measured and found to be $1.33 \times 10^{11}$ ohms ($6.67 \times 10^{10}$ ohms per square unit).

From the foregoing, it will be apparent that important advantages reside in the method of this invention whereby the antistatic properties of plastic and polymeric materials are greatly enhanced by the introduction thereinto of an effective internal anti-static agent which does not deleteriously affect the plastic or polymeric material for the purpose for which it is intended and which, at the same time, imparts a relatively durable and permanent antistatic characteristic thereto.

Although this invention has been described with reference to specific plastic and polymeric materials it will be apparent that still other different and equivalent materials may be substituted for those described. Likewise, method steps may be modified, reversed and, in some cases eliminated, all within the spirit and the scope of this invention as defined in the appended claims.

Having thus described my invention, I claim:

1. As a composition of matter, plastic material having internally incorporated therein from about 0.1% to about 20.0% by weight of an alkyl amine oxide characterized by the following generalized formula:

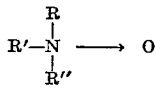

wherein R is an alkyl radical containing from 12 to 22 carbon atoms and wherein R' and R'' are each independently selected from the group consisting of an alkyl radical containing from 1 to 5 carbon atoms, a hydroxyalkyl radical containing from 1 to 5 carbon atoms and polyoxyalkylene ethers of said hydroxyalkyl radicals containing from 2 to 3 carbon atoms per oxyalkylene group and from 1 to 20 oxyalkylene groups per hydroxyalkyl radical and aliphatic radicals which taken together form with the nitrogen atom a 5 or 6 membered heterocyclic cycloaliphatic ring containing in addition to said nitrogen atom not more than 1 additional heteroatom selected from the group consisting of oxygen and sulfur.

2. A composition of matter according to claim 1 wherein said plastic material is a polyalkylene resin.

3. A composition according to claim 2 wherein said resin is polyethylene.

4. A composition according to claim 3 wherein said amine oxide is dimethyl hydrogenated tallow amine oxide.

5. In a method of imparting improved antistatic properties to solid plastic materials, the step which comprises incorporating into said plastic material prior to the solidification thereof from about 0.1% to about 20.0% by weight of an alkyl amine oxide characterized by the following generalized formula:

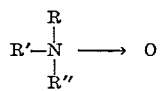

wherein R is an alkyl radical containing from 12 to 22 carbon atoms and wherein R' and R" are each independently selected from the group consisting of an alkyl radical containing from 1 to 5 carbon atoms, a hydroxyalkyl radical containing from 1 to 5 carbon atoms and polyoxyalkylene ethers of said hydroxyalkyl radicals containing from 2 to 3 carbon atoms per oxyalkylene group and from 1 to 20 oxyalkylene groups per hydroxyalkyl radical and aliphatic radicals which taken together form with the nitrogen atom a 5 or 6 membered heretocyclic cycloaliphatic ring containing in addition to said nitrogen atom not more than 1 additional heteroatom selected from the group consisting of oxygen and sulfur.

6. A method according to claim 5 wherein said plastic material is a thermoplastic material and is melted prior to incorporation of said alkyl amine oxide.

References Cited

UNITED STATES PATENTS 3,047,579    7/1962    Whitman _____ 260—243

JOSEPH L. SCHOFER, Primary Examiner

STANFORD M. LEVIN, Assistant Examiner

U.S. Cl. X.R.

260—67, 69, 73, 75, 77.5, 80, 80.3, 89.1, 89.5, 89.7, 91.3, 92.1, 92.3, 92.8, 93.5, 93.7, 119, 224